United States Patent
Martins et al.

(10) Patent No.: US 10,931,799 B2
(45) Date of Patent: Feb. 23, 2021

(54) HANDLING RESETS IN A SYSTEM WITH MULTIPLE RESET DOMAINS

(71) Applicant: Arm Limited, Cambridge (GB)

(72) Inventors: João Carlos Mateus da Silva Martins, Cambridge (GB); Alex James Waugh, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/417,925

(22) Filed: May 21, 2019

(65) Prior Publication Data

US 2020/0374377 A1    Nov. 26, 2020

(51) Int. Cl.
| | |
|---|---|
| H04L 29/14 | (2006.01) |
| H04L 12/823 | (2013.01) |
| H04L 12/715 | (2013.01) |
| H04L 29/06 | (2006.01) |
| H04L 12/841 | (2013.01) |

(52) U.S. Cl.
CPC .............. *H04L 69/40* (2013.01); *H04L 45/04* (2013.01); *H04L 47/28* (2013.01); *H04L 47/32* (2013.01); *H04L 69/08* (2013.01)

(58) Field of Classification Search
CPC ......... H04L 69/40; H04L 45/04; H04L 47/28; H04L 47/32; H04L 69/08
See application file for complete search history.

(56) References Cited

U.S. PATENT DOCUMENTS

| | | | |
|---|---|---|---|
| 7,668,089 B1* | 2/2010 | Srinivasan | H04L 47/24 370/237 |
| 2002/0009079 A1* | 1/2002 | Jungck | H04L 63/0263 370/389 |
| 2004/0006725 A1* | 1/2004 | Lakshmanamurthy | G06F 11/10 714/42 |
| 2013/0279340 A1* | 10/2013 | Nakash | H04L 47/24 370/237 |

* cited by examiner

*Primary Examiner* — Chi H Pham
*Assistant Examiner* — Ji-Hae Yea
(74) *Attorney, Agent, or Firm* — Nixon & Vanderhye P.C.

(57) ABSTRACT

An apparatus for handling resets corresponding to multiple reset domains comprises a transport network interconnecting elements to enable data to be transferred from one element to another, ingress circuitry to couple elements to the transport network, and egress circuitry to couple the transport network to the elements. The ingress circuitry couples source elements to the transport network, and is responsive to receiving data from a source element to generate at least one transport packet in order to send that data over the transport network. Each transport packet comprises a reset domain indicator indicative of the reset domain in which the source element operates. The egress circuitry couples the transport network to destination elements and, whilst a reset of a particular reset domain is asserted, discards transport packets for which the reset domain indicator indicates the particular reset domain.

21 Claims, 11 Drawing Sheets

HANDLING RESETS IN A SYSTEM WITH MULTIPLE RESET DOMAINS

BACKGROUND

Technical Field

The present technique relates to the field of data processing. More particularly, the invention relates to handling resets.

Technical Background

A data processing system can have a plurality of reset domains so that when a reset in a specific reset domain is asserted, existing data associated with that specific reset domain is discarded. When communicating between different elements of the system, data may be transferred over a transport network. Typically, this transport network will be operating in a different reset domain to at least some of the source and destination elements coupled to it, and as a result, when a specific reset domain other than the reset domain of the transport network is asserted, 'in-flight' data on the transport network for that specific reset domain may not be discarded, which can give rise to unexpected or incorrect behaviour within the system.

SUMMARY

At least some examples provide an apparatus comprising:
a transport network to interconnect a plurality of elements to enable data to be transferred from a source element in said plurality of elements to a destination element in said plurality of elements, wherein at least one element in said plurality of elements operates in a reset domain other than a reset domain of the transport network;
ingress circuitry to couple source elements to the transport network, the ingress circuitry being responsive to receiving data from a source element to generate at least one transport packet in order to send that data over the transport network, each transport packet comprising a reset domain indicator indicative of the reset domain in which the source element operates; and
egress circuitry to couple the transport network to destination elements and, whilst a reset of a particular reset domain is asserted, to discard transport packets for which the reset domain indicator indicates the particular reset domain.

At least some examples provide a method of handling resets comprising:
on a transport network to interconnect a plurality of elements, transferring data from a source element in said plurality of elements to a destination element in said plurality of elements, wherein at least one element in said plurality of elements operates in a reset domain other than a reset domain of the transport network;
at ingress circuitry to couple source elements to the transport network, responsive to receiving data from a source element, generating at least one transport packet in order to send that data over the transport network, each transport packet comprising a reset domain indicator indicative of the reset domain in which the source element operates; and
at egress circuitry to couple the transport network to destination elements, whilst a reset of a particular reset domain is asserted, discarding transport packets for which the reset domain indicator indicates the particular reset domain.

Further examples may provide an apparatus comprising:
transport network means for interconnecting a plurality of elements to enable data to be transferred from a source element in said plurality of elements to a destination element in said plurality of elements, wherein at least one element in said plurality of elements operates in a reset domain other than a reset domain of the transport network means;
ingress means for coupling source elements to the transport network means, the ingress means, responsive to receiving data from a source element, for generating at least one transport packet in order to send that data over the transport network means, each transport packet comprising a reset domain indicator indicative of the reset domain in which the source element operates; and
egress means for coupling the transport network means to destination elements and, whilst a reset of a particular reset domain is asserted, for discarding transport packets for which the reset domain indicator indicates the particular reset domain.

Further aspects, features, and advantages of the present technique will be apparent from the following description of examples, which is to be read in conjunction with the accompanying drawings.

DESCRIPTION OF EXAMPLES

Figure 1:
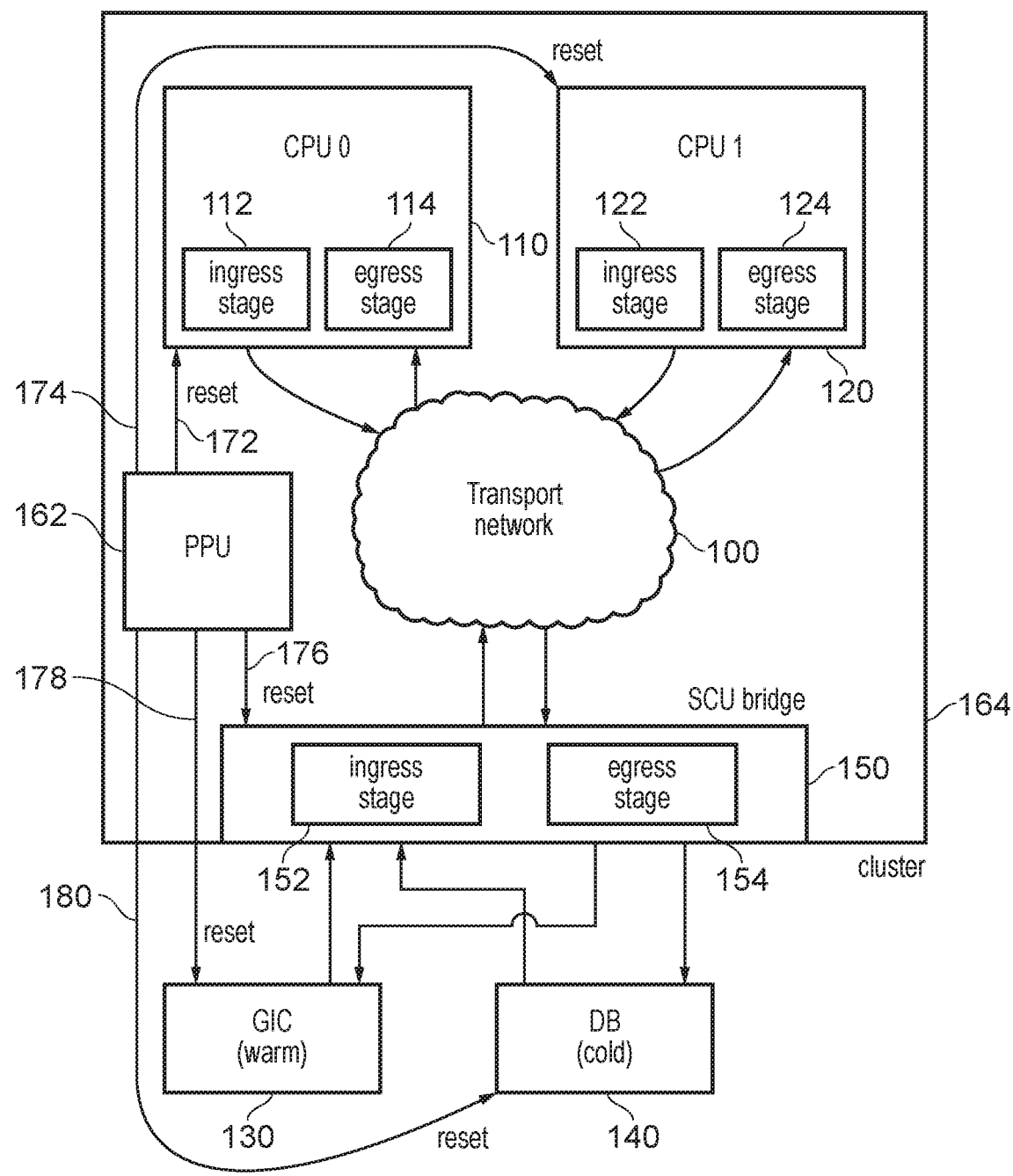
FIG. 1 illustrates a cluster of an integrated circuit with components in communication across a transport network, in accordance with one example implementation.

Some specific examples are described below. It will be appreciated that the invention is not limited to these exact examples.

An integrated circuit may have many elements that are required to be in communication. For instance, a Generic Interrupt Controller (GIC) may need to be able to transfer data indicative of an interrupt to a central processing unit (CPU). To connect these elements, a transport network is provided over which data, which may be in the form of packets, can be transferred from a source element to a destination element.

In general, there will be many elements and the transport network may interconnect all or some of these elements so that many possible communication paths are supported by the transport network. Indeed, it may be possible for all elements to send data to and receive data from all other elements. Alternatively, some elements may be configured to only communicate with certain other elements, or elements may be configured to only perform one of sending and receiving data.

Each element belongs to a reset domain. A reset specifying a particular reset domain can be asserted such that it acts in a particular reset domain but does not affect at least one other reset domain. Hence, certain reset domains can be selected for a reset to occur in without triggering a reset of another reset domain. A reset domain may include many elements with data transfers typically occurring between a source element and a destination element in the same domain.

When a reset is asserted in a reset domain, packets for that reset domain will not be created whilst the reset is asserted. However, in addition, existing packets in that reset domain that are in flight through the transport network should be discarded, since receipt of an unexpected packet at the recipient can cause protocol violations or deadlocks. Further it is also important that packets created after de-assertion of the reset are not discarded as otherwise information will be lost.

Because the transport network may handle data originating from multiple reset domains, the reset domain of the transport network is typically one such that a reset is not effected in the transport network unless a reset is also being effected in all of the other reset domains. Thus, when this occurs, all data that is being transferred will be lost, and so this may effectively act as a reset of the whole system.

Hence, it will often be the case that a reset may be asserted in a particular reset domain without the transport network being subjected to a reset, and this can cause issues with regard to correct handling of packets by the transport network to take account of the reset state of that reset domain. For instance, while a packet originating from a particular reset domain is being transmitted on the transport network, a reset of that particular reset domain could be asserted. As mentioned above, this packet could arrive at its destination despite the reset of the particular reset domain, and this can lead to protocol violations or deadlocks since the destination element may no longer be expecting the request or reply that the packet represents.

The inventors recognised that this situation could be alleviated with the present technique, leading to improved reliability of communication on the integrated circuit and avoidance of deadlocks and other issues associated with performing resets.

The technique described herein supplements the transport packet format used within the transport network by tagging packets to be sent on the transport network with an indicator of the reset domain from which they originated. Ingress circuitry and egress circuitry are provided in association with the transport network to manage the use of this additional information. When the packets exit the transport network, packets that are tagged as originating from a reset domain for which a reset is asserted can be discarded so that they do not reach the destination elements. In this way, when a reset of a reset domain is asserted, the existing data associated with that reset domain can be discarded, even if it was 'in-flight' on the transport network when the reset was asserted.

In accordance with the techniques described herein, ingress circuitry is provided to couple source elements to the transport network. The ingress circuitry receives, from a source element, data to be sent on the transport network, indicating the destination element to which the data is to be sent. The ingress circuitry then constructs a transport packet using the received data and includes a reset domain indicator (also referred to herein as a flag) to indicate the reset domain from which the packet originated, i.e., the reset domain in which the source element operates.

After travelling over the transport network, the transport packet is received at egress circuitry. The egress circuitry is configured to couple the transport network to the destination elements, forwarding packets that it receives to the appropriate destination element, whereupon the packet transition from the reset domain of the transport network to the reset domain of the destination element.

When a reset of a particular reset domain has been asserted, it is desirable to prevent packets that were not discarded by virtue of being within the transport network at the time of the reset from arriving at a destination element of that reset domain. To achieve this, the egress circuitry may be configured to examine the reset domain indicator of the transport packet and, having received an indication of a reset being asserted in a particular reset domain, the egress circuitry is arranged to discard transport packets for which the reset domain indicator indicates that particular reset domain.

Hence, by not allowing through packets that correspond to a reset domain that is being reset, it is possible to mitigate the effects of destination elements receiving unexpected packets and thereby reduce the chance of deadlocks or stalls occurring.

Each transport packet comprises a reset domain indicator indicative of the reset domain in which the source element operates. This may be in the form of a flag in the control portion of the transport packet. For example, in a system with just two reset domains, the reset domain indicator may be a single bit for which a value of zero indicates that the packet originated from a first reset domain and a value of one indicates that the packet originated from a second reset domain.

The data to be transferred between a source element and a destination element may take a variety of forms. It may for example represent a request for the destination element to take some action, such as processing an interrupt, or a reply to a request indicating that a requested action has been taken, such as an acknowledgement for the request or the provision of data that was the subject of the associated request. In one example implementation, this data is transferred over the transport network in the form of packets that may for example specify the type of data that is being carried, identification information such as the source and/or destination for the transfer, and a payload.

A reset of a reset domain may be invoked for a variety of different reasons, for example due to occurrence of certain events, such as a change in state of the corresponding domain (e.g. a change in power state), in response to a request from a device for a reset of a particular reset domain, as a method of recovering from an error or clearing a device, etc. In some systems, a reset of a particular domain may be asserted by changing a signal to a reset value (e.g. by raising the signal to a logic one value), with the signal remaining at the reset value for as long as the reset is asserted. According to such an example, the assertion of a reset would be indicated by the transition of the signal from an initial value (e.g. a logic zero value) to the reset value and the deassertion of the reset by the transition of the signal from the reset value to the initial value. In an alternative example, the assertion of a reset is indicated by a 'begin-reset' signal, with the reset to be considered asserted until an 'end-reset' signal is sent.

While the ingress circuitry could comprise a single ingress block, according to some examples, the ingress circuitry comprises an ingress block for each source element. By dividing the ingress circuitry in this way, each ingress block can be simplified so that it only has to generate transport packets that relate to the reset domain and source element with which it is associated. By employing this configuration, the ingress block could be moved inside the source element. For example, if the source element is a CPU, the CPU may perform the generation of a transport packet as well as any protocol conversion that may be needed before forwarding the transport packet on to the transport network, thus simplifying the design of the apparatus. According to these examples, the ingress circuitry may also comprise an arbiter to receive transport packets from multiple ingress blocks and couple them to the transport network. By employing such a configuration, the ingress circuitry may be simpler to implement, and functions specific to a source element or reset domain, such as the tagging of a packet with a particular reset domain indicator, or applying a particular protocol conversion, can be performed by the appropriate ingress block.

The egress circuitry may comprise at least one egress block configured to couple the transport network to a plurality of destination elements. The at least one egress block may couple the transport network to the destination elements, receive the transport packets from the transport network, perform any protocol conversion, which may include the removal of the reset domain indicator, and then route the resulting data to the appropriate destination element.

In some examples a single egress block could be used to couple the transport network to a plurality of destination elements (including for example destination elements in different reset domains). In such examples, an egress block may be configured to receive signals indicative of which resets are asserted and, in dependence on these signals, to discard the appropriate packets based on their reset domain indicator. The egress block may also perform the required routing based on a portion of the transport packet indicating a destination for the data, and may transition transport packets from the reset domain of the transport network back to the reset domain that corresponds with that from which it originated.

Alternatively, or in addition, the egress circuitry could comprise one or more egress blocks coupled to a single destination element. This may allow the egress block to be simplified as it does not need to handle packets destined for multiple reset domains and hence may be provided with additional functionality specific to a destination element or reset domain.

In addition to the egress circuitry being configured to discard transport packets, ingress blocks may comprise suppression circuitry to suppress onward propagation to the transport network of transport packets in response to assertion of a reset. Where each ingress block corresponds to a single source element, the ingress block may receive an indication that a reset is asserted in the corresponding reset domain and, since any packets it receives at this point should be subject to the reset, may prevent the packets travelling on to the transport network. In this way, it is possible to avoid data originating from a reset domain in which a reset is asserted entering the transport network. Consequently, the transport network has more capacity for packets that are still relevant and fewer transport packets are received at destination elements that should not be. This is because, by eliminating unwanted packets at an ingress block, the chance of a packet entering the transport network while a reset is asserted (i.e. the packet should be discarded) and then the reset being deasserted before the packet reaches the egress circuitry and consequently avoids being discarded, is reduced.

Whilst all ingress blocks may have suppression circuitry, it may be that only ingress blocks for source elements in reset domains other than a reset domain of the transport network have such suppression circuitry. For example, this may be the case when the transport network is only reset when power is removed from the apparatus. In this case when the power is removed, all packets will effectively be discarded and so there is no need for suppression circuitry in ingress blocks for the reset domain of the transport network.

In addition to elements of the apparatus operating in different reset domains, elements may also operate in different clock domains. Because a system may have more than one clock operating, it may be that certain elements operate asynchronously. It can be considered that elements or devices that operate according to the same clock, or synchronously, represent a clock domain, and so elements of a system can be grouped according to clock domain. These clock domains may coincide with the reset domains, but in general, the grouping of elements according to clock domain and reset domain is independent.

If a source element operates in a clock domain other than that of the transport network, the ingress block may comprise ingress asynchronous bridge circuitry to transition transport packets between the clock domains of the source element and the transport network, and thus enable communication between elements operating in different clock domains. This ingress asynchronous bridge circuitry receives packets under the timing of a first clock and disperses them under the timing of a second clock such that it can be considered that a timing boundary is present within the ingress asynchronous bridge circuitry.

In order to transition packets between clock domains, the ingress asynchronous bridge circuitry may use buffer storage, such as a first-in, first-out (FIFO) buffer, onto the tail of which packets arriving from source elements can be added in time with the source element's clock and from the head of which packets can be forwarded towards the transport network according to the transport network's clock. Such buffer storage may help to store data that arrives asynchronously.

This ingress asynchronous bridge circuitry may be provided with the above-mentioned suppression circuitry to perform the selective suppression of packets in order to effect an asserted reset. Suppression circuitry may be positioned upstream, downstream, or both upstream and downstream of the buffer storage to discard packets in response to assertion of a reset.

Synchronisation circuitry may also be provided so that when a reset is asserted in the clock domain of a source element, it can be transferred to the clock domain of the transport network. This synchronisation circuitry ensures that the reset is asserted in the network clock domain in response to its assertion in the source clock domain.

The synchronisation circuitry may operate in conjunction with ingress suppression circuitry located downstream of the buffer storage and be configured to suppress the onward propagation of the packets towards the transport network that it receives from the buffer storage. This is done based on the reset asserted in the network clock domain as transferred by the synchronisation circuitry. By providing such ingress suppression circuitry in combination with synchronisation circuitry, when a reset is asserted, it is possible to prevent packets entering the transport network even if they had effectively crossed a timing boundary by the time the reset was asserted (for example by having already been added to the buffer storage by that time) such that their onward handling is under the control of the network clock domain by the time the reset was asserted. By discarding these packets at this point, this enhances the ability to discard in-flight packets at the ingress end of the transport network following a reset, reducing the volume of packets that would otherwise need to be handled appropriately at the egress end of the transport network.

When a reset is deasserted, it is desirable to make sure that any packets that were generated or 'in-flight' while the reset was asserted are discarded, but that any packets generated after the reset was deasserted are not since these may correspond to requests for which a response is expected or may otherwise represent data that is to be maintained on the transport network. After a reset has been deasserted, any packets in the buffer storage of an associated ingress block should be discarded since they correspond to data from before the reset was deasserted. However, packets added to the buffer after deassertion of the reset should be maintained. To ensure that the correct packets are discarded by the suppression circuitry, the ingress asynchronous bridge circuitry may be arranged to insert a special packet (which may also be referred to herein as a divider packet) to separate packets to be discarded from those to be kept. Inserting this special packet ensures that when a reset is deasserted, any packets added to the buffer storage before the special packet were 'in flight' when the reset was asserted and so should be suppressed, whilst any packets added to the buffer storage after the special packet are to be maintained since they were added after deassertion of the reset.

Therefore, after deassertion of the reset is transferred into the network clock domain, the suppression circuitry may be configured such that instead of immediately ceasing the suppression of packet propagation, it instead continues to discard packets received from the buffer storage until the special packet is received. By taking this approach, more accurate discrimination between data to be discarded on a reset and data to be maintained after deassertion of a reset can be achieved. Further, by performing such an operation at the ingress circuitry, the apparatus is able to prevent packets from travelling on the network that are to be discarded and consequently this approach can lead to more capacity on the transport network for other data.

Instead of, or in addition to, the ingress suppression circuitry operating downstream of the buffer storage, the apparatus may be provided with buffer suppression circuitry to suppress the adding of transport packets to the buffer storage. When a reset is asserted, the buffer suppression circuitry, in the source clock domain, may be configured to discard packets that it receives or otherwise prevent the packets being forwarded to the buffer storage.

This represents one way of implementing the suppression circuitry as described above and confers the advantages described with reference thereto. However, the use of such buffer suppression circuitry is particularly beneficial when provided in conjunction with the ingress suppression circuitry described above (so that the buffer suppression circuitry and the ingress suppression circuitry collectively form the suppression circuitry). With both buffer suppression circuitry and ingress suppression circuitry, when a reset is asserted, both portions of the suppression circuitry may be configured to suppress the propagation of data that they receive. Thus, the buffer suppression circuitry prevents data from progressing to the buffer storage if it is only to be discarded by the ingress suppression circuitry later. This avoids the energy and processing costs associated with having that data enter the buffer storage, means that there will be less in the buffer storage when the reset is deasserted and so the valid data can progress to the transport network more quickly, and it makes it less likely that the buffer storage becomes full.

The egress circuitry may be provided with similar features to those described above in relation to the ingress circuitry. Specifically, the egress circuitry may be provided with egress asynchronous bridge circuitry; synchronisation circuitry; buffer storage; and suppression circuitry, which may be buffer suppression circuitry and/or egress suppression circuitry.

However, these features of the egress circuitry may differ in their implementation as will now be described.

Firstly the egress circuitry receives packets from the transport network and supplies them to the destination elements. Hence, the egress circuitry may be configured to route packets to the appropriate destination element, rather than forwarding them to the transport network as the ingress circuitry would.

Buffer suppression circuitry of the egress circuitry may operate in a similar way to that of the ingress circuitry. However, the indication of the reset may have come from the destination clock domain with the synchronisation circuitry transferring it into the transport clock domain.

Also, because there may be an ingress block for each source element while an egress block may serve more than one element, the egress circuitry may be configured to inspect the packets it receives so that it only suppresses packets in response to resets in the reset domain of that packet.

The egress circuitry may be configured to use special packets in an analogous way to the use of special packets by the ingress circuitry. However, in some examples, instead of discarding special packets produced by the ingress circuitry at the ingress suppression circuitry, these packets are allowed to travel over the transport network, becoming special packets for the egress circuitry. Thus, in some implementations a special packet may not be produced at the egress circuitry, but instead the egress suppression circuitry may be configured to operate in response to the special packet from the ingress circuitry, with that special packet acting to separate packets that should and should not be reset.

It may be the case that the data received by the ingress circuitry is encoded using a different protocol than that used by the transport network. For example, if the source element is a GIC, the data may be encoded according to a GIC protocol, while if the source element is a debug component the debug data may be encoded in accordance with a protocol such as the Advanced Peripheral Bus (APB) protocol forming part of the Advanced Microcontroller Bus Architecture (AMBA) developed by Arm Limited, Cambridge, United Kingdom. However, if the protocol used on the transport network is different, such as the Advanced eXtensible Interface (AXI) protocol also provided by AMBA, some protocol conversion may need to occur before the data is forwarded onto the network. In some examples, the ingress circuitry may comprise protocol conversion circuitry to generate transport packets, based on the data it receives from source elements, where the transport packets use a protocol associated with the transport network. The protocol conversion circuitry may also be configured to perform the addition of the reset domain indicator, as described above, at this stage.

Many elements of a system may need to be able to both send and receive data. Therefore, according to some examples of the apparatus, at least one element operates as a source element for a first data transfer and a destination element for a second data transfer. For example, a debug controller may act as a source element when requesting data from a CPU, with the CPU acting as a destination element for this transfer. Then when the CPU issues a response to the debug controller, the CPU acts as a source element and the debug controller acts as a destination element. There may also be elements that are configured to operate only as a source element or only as a destination element. For example, there may be at least one master device that only issues data and does not receive any data back and so can function solely as a source element.

Whilst it may be the case that each device in a system is a single element and so each device is associated with a single reset domain, this is not a requirement. For example, according to some examples, a single device may comprise at least two elements operating in different reset domains. For example, a CPU may be configured with more than one reset domain where it is handling different types of data that need to be reset according to different conditions. Therefore, a CPU may comprise several elements corresponding to these different reset domains.

In some examples of the apparatus, at least two elements operate in reset domains other than a reset domain of the transport network and different from each other, resulting in a total of at least three different reset domains. This may be done to enable more granular control over the data that is to be reset and mean that a more targeted approach to the suppression of packets can be employed.

In this case, resets may be asserted for the appropriate reset domains and the apparatus may receive an indication of the reset domain for which the reset is asserted in addition to the assertion/deassertion information. Thus, by responding to the resets indicated independently, the ingress and egress circuitry can handle resets from several domains. So if a reset is asserted in a first reset domain, the apparatus may start discarding packets indicated as originating from that reset domain whilst maintaining packets indicated as coming from a second reset domain.

The transport network may operate in a reset domain for which a reset is only asserted if a reset is asserted in all other reset domains. This ensures that data on the transport network is not discarded due to a reset of the transport network when the reset domain associated with that data has not been reset itself. This can be achieved by only resetting the transport network when the power is removed (known as a cold reset), as by doing this all of the data being transmitted will effectively be discarded. In turn, elements may operate in the same reset domain as the transport network and so be in the cold reset domain, or elements may be in a warm reset domain which can be reset without resetting the transport network.

The other reset domains may be independent of each other, i.e. a reset of one domain does not affect whether a reset is asserted in another. Alternatively, there may be some form of hierarchy of reset domains. Similar to the way in which a reset of the transport network invokes a reset of all of the other reset domains (the transport network is in a cold reset domain and the other reset domains are warm reset domains), there may be a hot reset domain for which a reset is always invoked when a reset of a particular warm reset domain is triggered.

Where these hierarchies of reset domains exist, the system may be configured to automatically assert the resets in the correct domains with this functionality being implemented in a power policy unit (PPU) for example. A PPU may exist as dedicated hardware to handle power modes and policies of a system, and is responsible for controlling the assertion/deassertion of resets. However, in other examples, the egress and/or ingress circuitry may be configured to perform this functionality. Thus the apparatus may receive an indication that a reset is to be asserted in a warm reset domain, and in addition to discarding packets associated with that domain may also discard packets for the corresponding hot reset domain. In this way, greater flexibility and control can be exercised over the effects of the different resets that can be asserted within a system.

Specific examples will now be described with reference to the appended figures.

FIG. 1 illustrates a cluster 164 of an integrated circuit having two CPUs 110, 120, a transport network 100, a Snoop Control Unit (SCU) bridge 150 and a power policy unit (PPU) 162. In communication with the cluster 164 are a Generic Interrupt Controller (GIC) 130 and a Debug Block (DB) 140.

The CPUs 110, 120 are to perform data processing tasks but are also required to be in communication with other devices in the system. The transport network 100 is to interconnect all of the devices to all of the other devices 110, 120, 130, 140 so that any device 110, 120, 130, 140 can communicate by sending data, in the form of packets, to any other device 110, 120, 130, 140. The SCU bridge 150 provides a connection between the cluster 164 and devices 130, 140 located outside the cluster 164.

Each CPU 110, 120 comprises an ingress stage 112, 122 which comprises the ingress circuitry for the CPU 110, 120, and handles dispatch of packets from the CPU 110, 120, and an egress stage 114, 124 which comprises egress circuitry for the CPU 110, 120, and handles packets received from the transport network for the CPU 110, 120. The SCU bridge 150 similarly comprises an ingress stage 152 and an egress stage 154 to couple the transport network 100 to the GIC 130 and the DB 140.

The transport network 100 is connected to both CPUs 110, 120, as well as being coupled to the GIC 130 and the DB 140 via the SCU bridge 150.

The CPUs 110, 120 may each be configured to have a plurality of elements that can each communicate over the transport network 100, whilst the GIC 130 and the DB 140 can each be considered to represent a single element.

Each element has an associated reset domain. The GIC 130 is configured to operate in a warm reset domain and the DB 140 is configured to operate in a cold reset domain. In the illustrated example, each of the elements of the CPUs 110, 120 operate in one of the warm or cold reset domains.

Data to be transferred between elements is generated at the source element before being passed to the appropriate ingress stage whereupon one or more transport packets are formed to represent the data. Each transport packet includes a flag to indicate the reset domain from which the data originated. In the example depicted in FIG. 1, there are two reset domains (warm and cold) and so the reset domain indicator is represented by a single bit in the transport packet, with for example a value of zero indicating a cold reset domain and a value of one indicating a warm reset domain. The ingress circuitry then sends the transport packet over the transport network 100 to the destination element, i.e. to the element to which the source element identified the data should be sent.

The transport packet arrives at an egress stage 114, 124, 154 corresponding to the destination element. At the egress stage 114, 124, 154, if a reset of the relevant reset domain is not asserted, egress circuitry routes the transport packet to the destination element.

However, the PPU 162 is configured to be able to assert a reset in a given reset domain. For example, in response to a given event, such as a change in state of the system, the PPU 162 may trigger a reset of a reset domain. The PPU 162 signals the assertion of the reset to relevant components of the system as depicted by arrows 172, 174, 176, 178, 180. In response to assertion of a warm reset, the egress circuitry is configured to inspect the transport packets it receives, and for transport packets with data originating from a warm reset domain (i.e. the reset domain indicator has a value of one when using the earlier-mentioned example), to discard those transport packets. In this way, when a reset of the warm reset domain is asserted, as well as discarding data within the reset domain, packets that are 'in-flight' on the transport network are discarded and so do not arrive at an element in a warm reset domain unexpectedly.

While the warm reset is asserted, packets with data originating from a cold reset domain are identified as such at the egress stage 114, 124, 154 and forwarded to the appropriate destination element without being discarded. Thus, by way of specific example, during a warm reset data arriving at the egress stage 114 for CPU 0 110 from the GIC 130 are discarded, while data from the DB 140 are forwarded on to their destination. Accordingly, the reset can be effected even for packets that are on the transport network 100 at the time of the reset being asserted.

In this example, a cold reset, i.e. a reset of the cold reset domain, may be effected by removing power from the components. The cold reset is configured to reset devices operating in both the hot and cold reset domains. Upon removing the power, all data being transferred is effectively discarded, including that on the transport network 100. Thus the transport network 100 can be considered to operate in the cold reset domain. By having the transport network 100 only be reset when all other reset domains are reset, data is not lost when a reset of the transport network 100 is asserted and a reset is not asserted elsewhere. According to other examples, the cold reset may be asserted without removing power from the components, with a cold reset signal being issued instead to indicate that a reset should be asserted across all domains.

Figure 2:
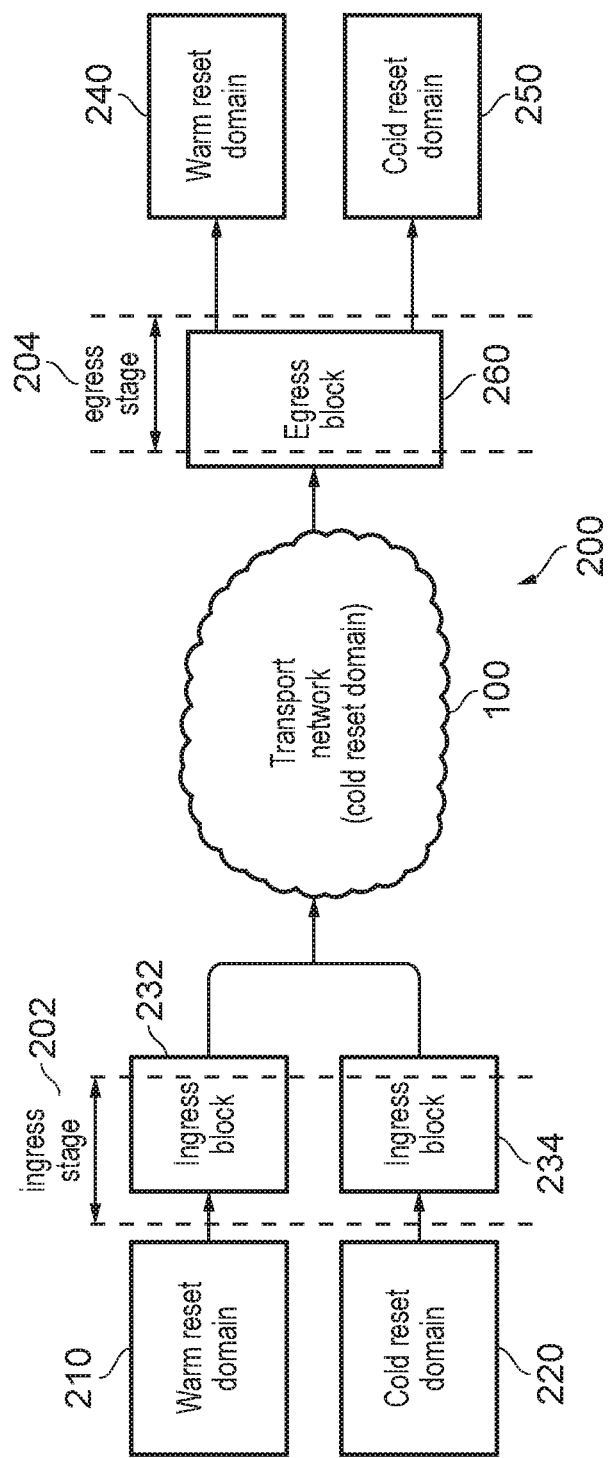
FIG. 2 illustrates an apparatus to transport data from one of two source reset domains, over the transport network, to corresponding destination reset domains, in accordance with one example implementation.

FIG. 2 illustrates a schematic of an apparatus 200 to transport packets across a transport network 100. In this example, data is to be transferred either from warm reset domain 210 to warm reset domain 240 or from cold reset domain 220 to cold reset domain 250.

Within the scope of this example, each reset domain 210, 220, 240, 250 may have a single element, or there may be multiple elements within a single reset domain 210, 220, 240, 250.

Here the ingress stage 202 has been depicted as two ingress blocks 232, 234, each corresponding to a reset domain 210, 220 from which the data originates.

Each ingress block 232, 234 receives data from the associated reset domain 210, 220, and performs the addition of the reset domain indicator to indicate the reset domain 210, 220 from which the data originated and hence the reset domain 210, 220 that should be associated with the data.

After forming a transport packet at the ingress block 232, 234, the transport packet is forwarded onto the transport network 100 along with any packets from other ingress blocks 232, 234.

Having travelled over the transport network 100, the transport packets arrive at the egress stage 204. In this example, there is provided a single egress block 260 for both the warm reset domain 240 and cold reset domain 250. The egress block 260 therefore discards packets in response to a reset being asserted in the reset domain 240, 250 indicated by those packets. For packets that are not discarded, the egress block 260 then routes the data to the appropriate destination element using information regarding the destination of the data indicated in a control portion of the packet.

Figure 3:
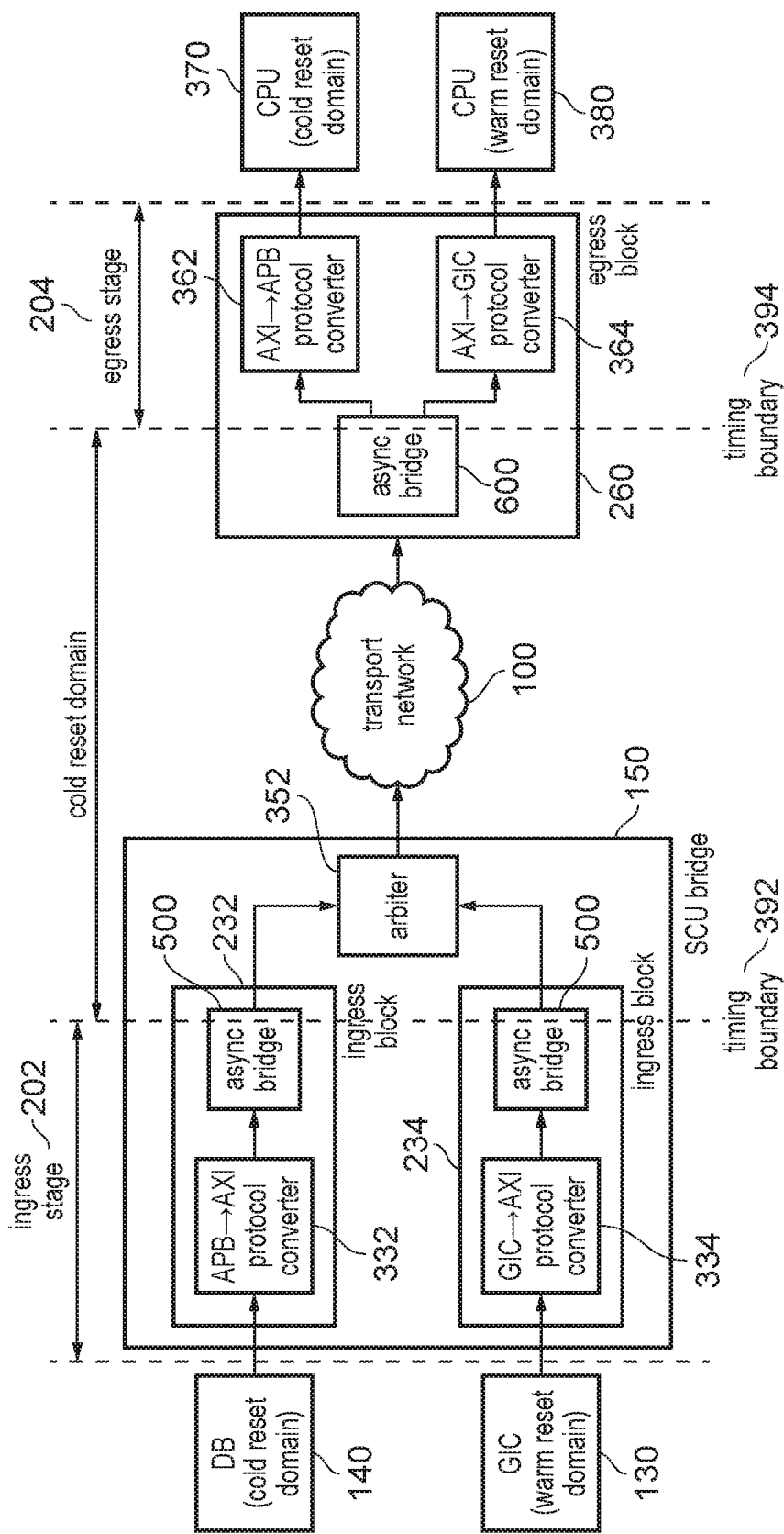
FIG. 3 illustrates in more detail the example of FIG. 2.

FIG. 3 illustrates in more detail the example of FIG. 2. Here the depiction of the reset domains 210, 220, 240, 250 of FIG. 2 have been replaced by the elements 130, 140, 370, 380 operating in those domains. So there is a DB 140 and a GIC 130 operating in the cold and warm reset domains 220, 210 respectively. On the other side of the transport network 100, there is depicted a CPU 110 having elements 370, 380 in the cold and warm reset domains 240, 250, respectively.

As shown in FIG. 3, the ingress stage 202 comprises two ingress blocks 232, 234, one for each of the source elements 130, 140. In this example, each ingress block 232, 234 includes protocol conversion circuitry 332, 334. Considering the ingress block 232 for the DB 140, the ingress block 232 has an APB-to-AXI protocol converter 332 to convert the data that is received from the DB 140 according to an APB protocol to an AXI protocol that is to be used for transport packets travelling over the transport network 100. Similarly, ingress block 234 has a GIC-to-AXI protocol converter 334 to convert between GIC and AXI protocols.

In this example, the DB 140, GIC 130 are operating in a different clock domain to the transport network 100 (and indeed could be operating in different clock domains to each other). Therefore, to transition packets from one clock domain to another, each ingress block 232, 234 is provided with an ingress asynchronous bridge 500. The ingress asynchronous bridge 500 receives packets with a timing governed by the source element 130, 140 and provides them at a timing governed by the transport network 100. As such it can be considered that there is a timing boundary 392 that exists within the ingress asynchronous bridge 500.

Similar egress asynchronous bridge circuitry 600 is provided as part of the egress block 260. The egress asynchronous bridge circuitry 600 is thus configured to transition packets between the clock domain of the transport network 100 and the clock domain of the destination element 370, 380 and thus a timing boundary 394 can be considered to exist in the egress asynchronous bridge 600.

The ingress blocks 232, 234 form part of an SCU bridge 150 that provides an interface for devices 130, 140 not located within a cluster to communicate with the devices that make up that cluster, such as the CPU 0 110. Also located within the SCU bridge 150 is an arbiter 352 that receives transport packets from the different ingress blocks 232, 234 and performs an arbitration operation in order to select which packet to dispatch next to the transport network 100.

In this example, in response to a reset, packets may be discarded at one of the ingress blocks 232, 234 or the egress block 260 as will be described further with reference to FIGS. 5 and 6.

Figure 4:
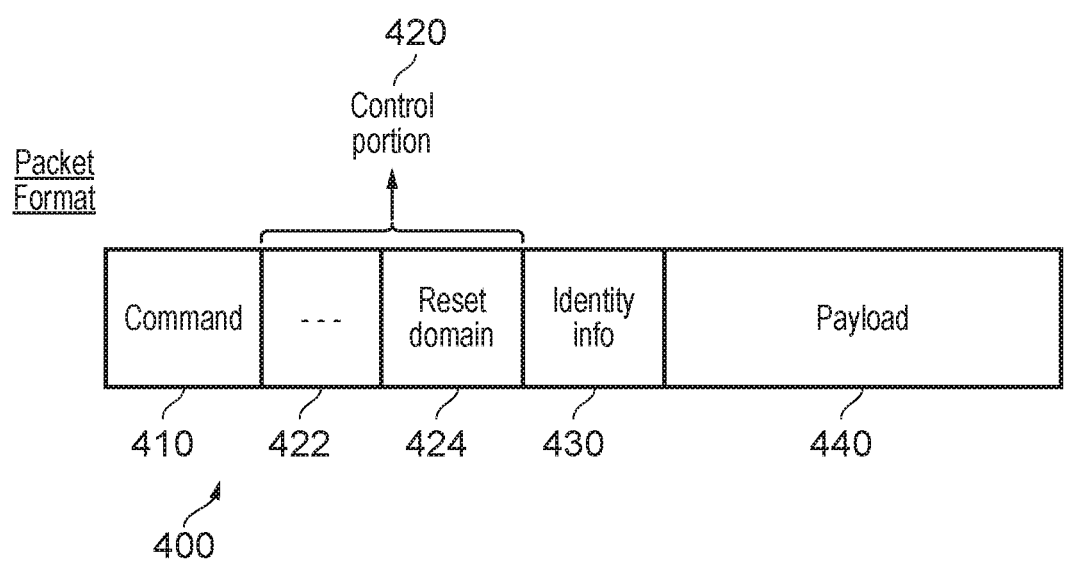
FIG. 4 illustrates the structure of an exemplary transport packet.

FIG. 4 illustrates the structure of an exemplary transport packet 400 constructed at the ingress circuitry. The transport packet 400 comprises a command portion 410, a control portion 420, where the control portion comprises at least a reset domain indicator 424, identity information 430, and a payload 440.

The command portion 410 is to signal the type of packet. For example, the command portion 410 may indicate that the packet contains a request, or a response to a request, and may also distinguish between different types of request, for example a read request, a write request, etc.

The control portion 420 may comprise other information required by the destination to determine how to process the received packet. The control portion 420 also comprises a reset domain indicator 424, added by ingress circuitry to indicate the reset domain from which the data originated. This may be in the form of a single bit to distinguish between one of two reset domains, or may be a longer reset domain ID value.

According to some examples, the identity information 430 may be used to provide source and/or destination information associated with the packet. For example, in communications including a CPU, this identity information may indicate a CPU associated with the data. So for data originating from a CPU, this may identify the CPU, whilst for data destined for a CPU, the identity information 430 may identify the CPU for which the packet 400 is destined.

The payload 440 of the transport packet 400 may contain data to be transferred over the transport network 100. For instance, the payload 440 may specify more details of the request or may hold data forming a response.

Figure 5:
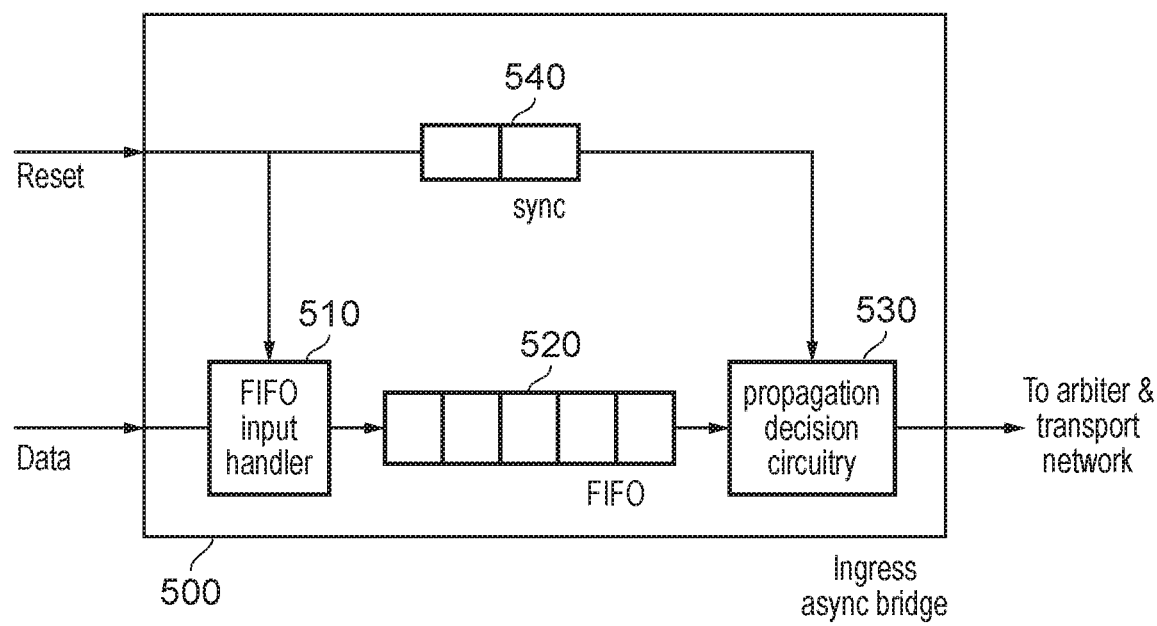
FIG. 5 illustrates the ingress asynchronous bridge of FIG. 3 in more detail, in accordance with one example implementation.

FIG. 5 illustrates in more detail the ingress asynchronous bridge 500 of FIG. 3. The ingress asynchronous bridge 500 is arranged to operate in response to data received from an associated source element 130, 140 and a reset signalled by the PPU 162. Whilst in one implementation each ingress asynchronous bridge could be constructed as shown in FIG. 3, in one particular example implementation where the source elements operate in either the warm reset domain or the cold reset domain, and the cold reset domain also applies to the transport network, only the ingress asynchronous bridge 500 within an ingress block for a source element in the warm reset domain is constructed as shown in FIG. 5, since for data originating from an element in the cold reset domain, that data will in any case be lost on assertion of the cold reset, due to the transport network being reset.

The ingress asynchronous bridge 500 is provided with synchronisation circuitry 540 to transfer a reset asserted in the source clock domain (the clock domain of the associated source element 130, 140) to the network clock domain (the clock domain of the transport network 100). Accordingly, when a reset is asserted/deasserted in the source clock domain, the synchronisation circuitry 540 is arranged to assert/deassert that reset in the network clock domain contemporaneously.

Packets received in the ingress asynchronous bridge 500 are initially handled by FIFO input handler 510. In dependence on the assertion of resets, the FIFO input handler 510 selectively forwards packets to the FIFO buffer 520. The FIFO buffer 520 acts as a queue, storing packets it receives from the FIFO input handler 510 and allowing packets to be taken by propagation decision circuitry 530 such that packets are dispatched in the same order as the order in which they arrived (i.e. first-in, first-out). This enables transition of packets across a timing boundary 392.

The operation of FIFO input handler 510 will now be described with reference to FIG. 7A which is a flowchart illustrating the operation of the FIFO input handler 510.

The FIFO input handler 510 is configured to receive a signal indicating when a reset has been asserted in the reset domain of the associated source element. In the above-mentioned example, the FIFO input handler 510 will hence receive a signal indicative of whether a reset is asserted in the warm reset domain 210.

Figure 7A:
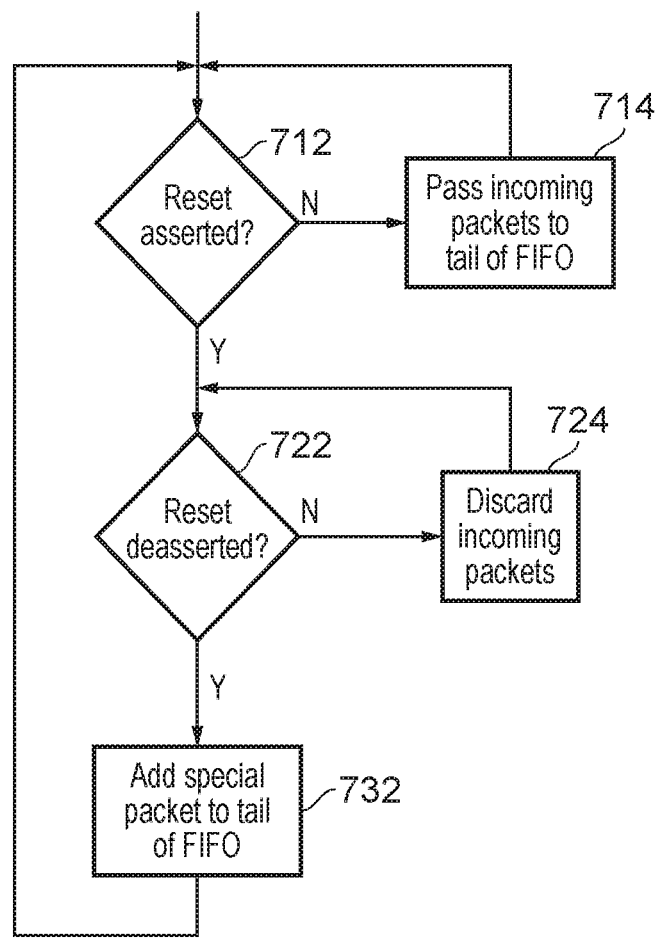
FIG. 7A is a flowchart illustrating the operation of the FIFO input handler of FIG. 5, in accordance with one example implementation.

Step 712 of FIG. 7A depicts the FIFO input handler 510 checking whether a reset is asserted in the warm reset domain 210. If a reset is not asserted, the FIFO input handler 510 is configured to pass incoming packets to the tail of the FIFO buffer 520, as shown in step 714. After a reset of the warm reset domain is asserted, the FIFO input handler 510 is configured to discard packets indicating the warm reset domain 210 until the reset is deasserted, as depicted by steps 722 and 724 of FIG. 7A.

Once the reset of the warm reset domain 210 has been deasserted, the FIFO input handler 510 adds a special packet to the tail of the FIFO buffer 520, as shown in step 732, before proceeding to allow incoming packets to progress to the FIFO buffer 510 until another reset is asserted in the warm reset domain 210.

The special packet added to the FIFO buffer 520 is treated similarly in the FIFO buffer 520 to the other packets, but is distinguishable as a special packet indicative of a reset having been deasserted. In this example, the special packet does not need to distinguish the particular reset domain for which the reset was deasserted, but in examples with more reset domains or reset domains that are not automatically reset by removing the power, the special packet may indicate the reset domain for which the reset was deasserted. Since the FIFO buffer 520 maintains the order of the packets that it stores, any packets downstream of the special packet correspond to packets that entered the FIFO buffer 520 before the reset was deasserted (including at a time before the reset was asserted in the first place) while the packets upstream of the special packet must have entered the FIFO buffer 520 after the reset was deasserted.

Therefore, packets downstream of the special packet that originated from a warm reset domain should be discarded whilst packets upstream of the special packet should be maintained. This operation is carried out by the propagation decision circuitry 530 and will now be explained with reference to FIG. 7B which is a flowchart illustrating the operation of the propagation decision circuitry 530.

The propagation decision circuitry 530 is configured to receive the reset signal provided to the ingress asynchronous bridge, but synchronised to the network clock domain via the synchronisation circuitry 540.

Figure 7B:
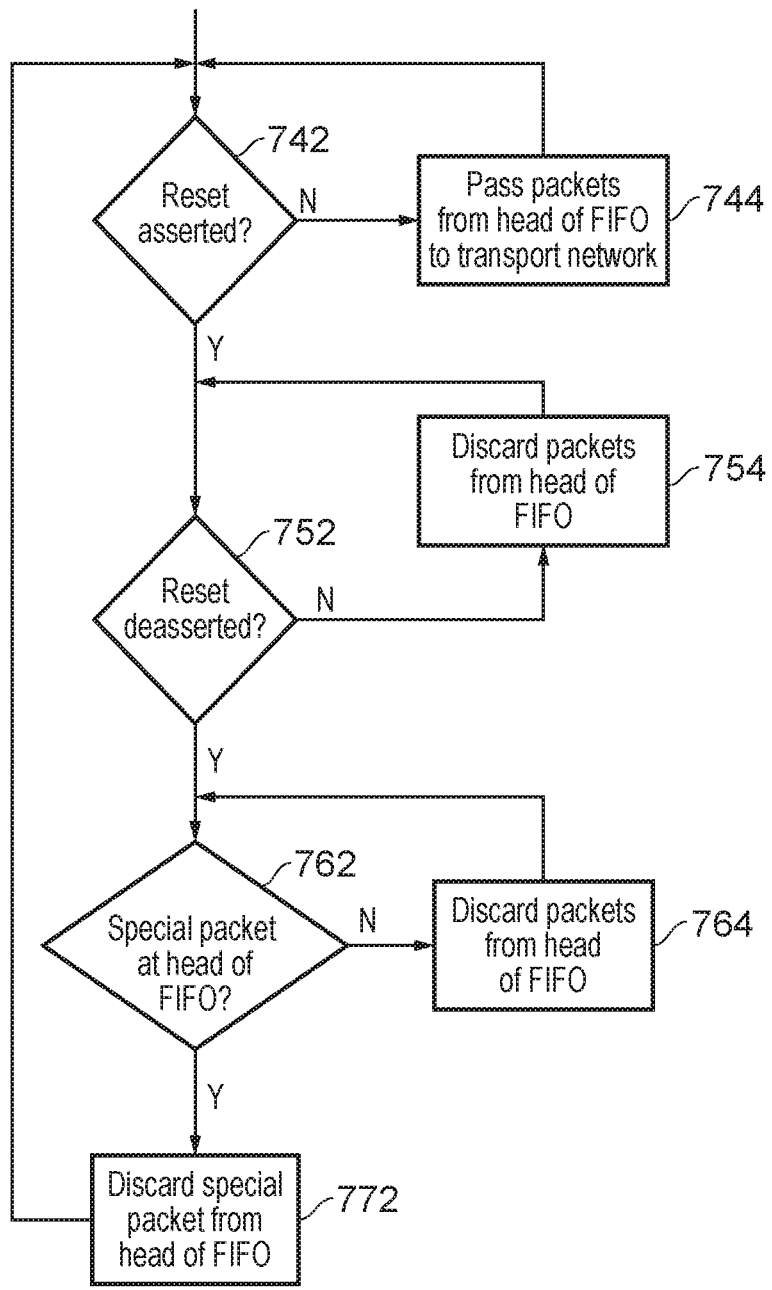
FIG. 7B is a flowchart illustrating the operation of the propagation decision circuitry of FIG. 5, in accordance with one example implementation.

Step 742 of FIG. 7B depicts the propagation decision circuitry 530 checking whether a reset is asserted in the warm reset domain 210 and is signalled as such in the network clock domain. If a reset is not asserted, the propagation decision circuitry 530 is configured to pass packets retrieved from the buffer 520 on to the arbiter 352 to be sent on the transport network 100.

After a reset of the warm reset domain 210 is asserted and signalled via the synchronisation circuitry 540 in the network clock domain, the propagation decision circuitry 530 is configured to discard packets indicating the warm reset domain 210 whilst the reset is asserted, as depicted by steps 752 and 754 of FIG. 7B.

After the reset has been deasserted, packets received from the FIFO buffer 520 may still have been generated before the reset was deasserted and accordingly should be discarded.

Therefore, the propagation decision circuitry 530 continues to discard the packets that it receives from the buffer 520 until the special packet is received, as depicted in steps 762 and 764 of FIG. 7B. When the special packet is received at the propagation decision circuitry 530 to indicate that the subsequent packets of the corresponding reset domain are to be maintained, the special packet can be discarded and the propagation decision circuitry 530 return to allowing the onward propagation of packets.

In this example, as indicated by step 772, the special packet is discarded when received at the propagation decision circuitry 530, having been used to prevent packets entering the transport network 100 that are no longer of interest to the system. The egress asynchronous bridge circuitry 600 may operate in a similar manner, producing its own special packet to add into its local buffer. However, in an alternative implementation the egress asynchronous bridge circuitry 600 does not produce its own special packet. Instead, the propagation decision circuitry 530 of the ingress asynchronous bridge 500 may be configured not to discard the special packet, and the special packet is passed on to be sent over the transport network 100 for use as the special packet at the egress asynchronous bridge 600.

Figure 6:
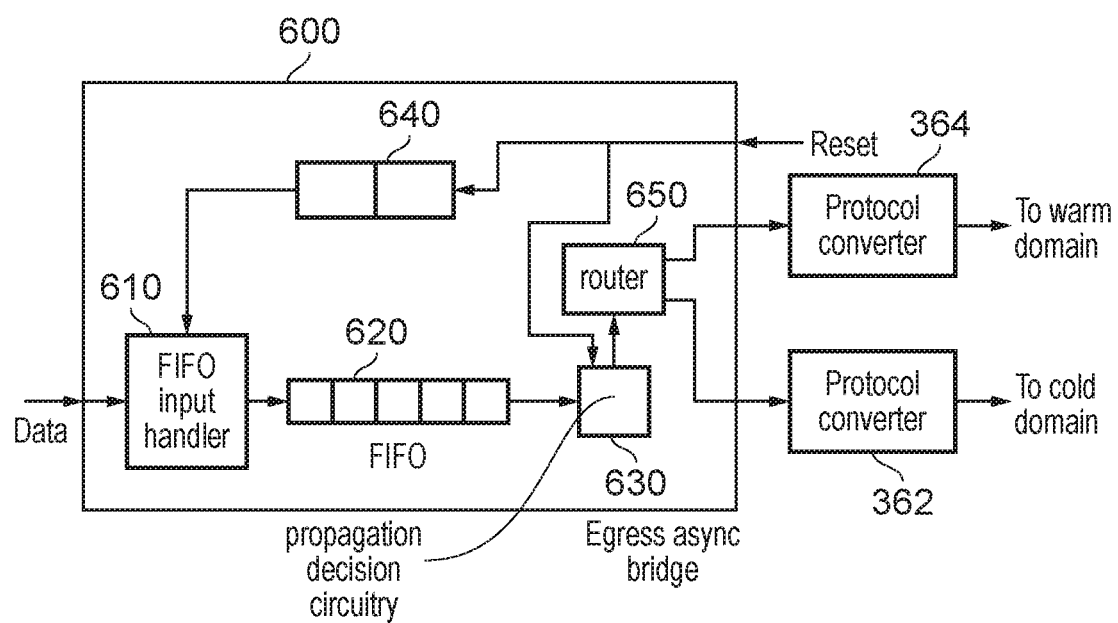
FIG. 6 illustrates the egress asynchronous bridge of FIG. 3 in more detail, in accordance with one example implementation.

Returning to the apparatus shown in FIG. 3, the egress block 260 provides an egress asynchronous bridge 600 that is shown in greater detail in FIG. 6.

The egress asynchronous bridge 600 is arranged to operate in response to data received from the transport network 100 and a reset signalled by the PPU 162.

The egress asynchronous bridge 600 is provided with synchronisation circuitry 640 to transfer a reset asserted in the destination clock domain (the clock domain of the associated destination element 370, 380) to the network clock domain. Accordingly, when a reset is asserted/deasserted in the destination clock domain, the synchronisation circuitry 640 is arranged to assert/deassert that reset in the network clock domain contemporaneously.

Packets received in the egress asynchronous bridge 600 are initially handled by FIFO input handler 610. In dependence on the assertion of resets, the FIFO input handler 610 selectively forwards packets to the FIFO buffer 620. The FIFO buffer 620 acts as a queue, storing packets it receives from the FIFO input handler 610 and allowing packets to be taken by propagation decision circuitry 630 such that packets are routed on in the same order as the order in which they arrived (i.e. first-in, first-out). This enables transition of packets across a timing boundary 394.

Figure 8A:
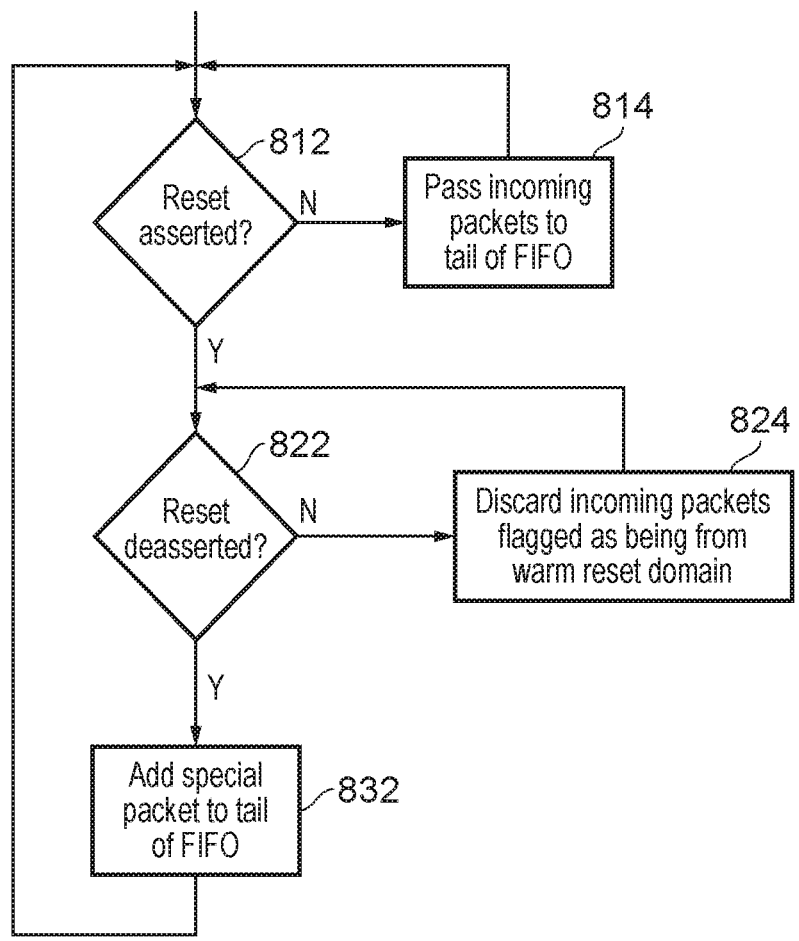
FIG. 8A is a flowchart illustrating the operation of the FIFO input handler of FIG. 6, in accordance with one example implementation.

The operation of FIFO input handler 610 of the egress asynchronous bridge 600 is similar to the operation of FIFO input handler 510 of the ingress asynchronous bridge 500 described above, other than the fact that the incoming packets received from the transport network may be in either reset domain, and is depicted in FIG. 8A which is a flowchart illustrating the operation of the FIFO input handler 610.

The FIFO input handler 610 is configured to receive information regarding the reset domains for which a reset is asserted via the synchronisation circuitry 640. In this example, there are two reset domains, warm 240 and cold 250, and since a cold reset is effected by removing power from the apparatus 200, the FIFO input handler 610 only needs to receive a signal indicative of whether a reset is asserted in the warm reset domain 240. Thus, irrespective of whether the warm reset is asserted or not, the FIFO input handler 610 in this example is configured to pass on to the FIFO buffer 620 any packet it receives with a reset domain indicator indicating that it originated from a cold reset domain 250, as these packets will automatically be lost when the power is removed.

Step 812 of FIG. 8A depicts the FIFO input handler 610 checking whether a reset is asserted in the warm reset domain 240, as synchronised to the network clock domain by the synchronisation circuitry 640. If a reset is not asserted, the FIFO input handler 610 is configured to pass incoming packets to the tail of the FIFO buffer 620, as shown in step 814. After a reset of the warm reset domain 240 is asserted, the FIFO input handler 610 is configured to discard packets indicating the warm reset domain 240 until the reset is deasserted, as depicted by steps 822 and 824 of FIG. 8A. However, as mentioned earlier, packets indicating the cold reset domain continue to be added to the tail of the FIFO buffer 620.

Once the reset of the warm reset domain 240 has been deasserted in the network clock domain, the FIFO input handler 610 adds a special packet to the tail of the FIFO buffer 620, as shown in step 832, before proceeding to allow incoming packets to progress to the FIFO buffer 620 until another reset is asserted in the warm reset domain 240.

The special packet added to the FIFO buffer 620 is treated similarly in the FIFO buffer 620 to the other packets, but is distinguishable as a special packet indicative of a reset having been deasserted. In this example, the special packet does not need to distinguish the particular reset domain for which the reset was deasserted, but in examples with more reset domains or reset domains that are not automatically reset by removing the power, the special packet may indicate the reset domain for which the reset was deasserted. Since the FIFO buffer 620 maintains the order of the packets that it stores, any packets downstream of the special packet correspond to packets that entered the FIFO buffer 620 before the reset was deasserted (including at a time before the reset was asserted in the first place) while the packets upstream of the special packet must have entered the FIFO buffer 620 after the reset was deasserted.

Therefore, packets downstream of the special packet that originated from a warm reset domain should be discarded whilst packets upstream of the special packet should be maintained.

In an alternative implementation in which the special packet is not discarded at the propagation decision circuitry 530 of the ingress asynchronous bridge 500, a special packet is not generated at the FIFO input handler 610 of the egress asynchronous bridge 600 and instead the special packet is received from the transport network 100 and proceeds through the egress asynchronous bridge 600 to the propagation decision circuitry 630 thereof where it can be acted upon.

Whichever way the special packet arrives at the propagation decision circuitry 630, the propagation decision circuitry 630 uses the special packet to determine which packets should be discarded. This operation will now be explained with reference to FIG. 8B which is a flowchart illustrating the operation of the propagation decision circuitry 630.

The propagation decision circuitry 630 is configured to receive information regarding the reset domains for which a reset is asserted. As is the case for the FIFO input handler 610, packets with a reset domain indicator indicating that the data originated from a cold reset domain are passed on, in this case to the router 650 which is configured to determine, using information in the transport packet, where the packet is to be sent. The router 650 then directs the packet to the appropriate reset domain 240, 250 via a protocol converter 362, 364.

Figure 8B:
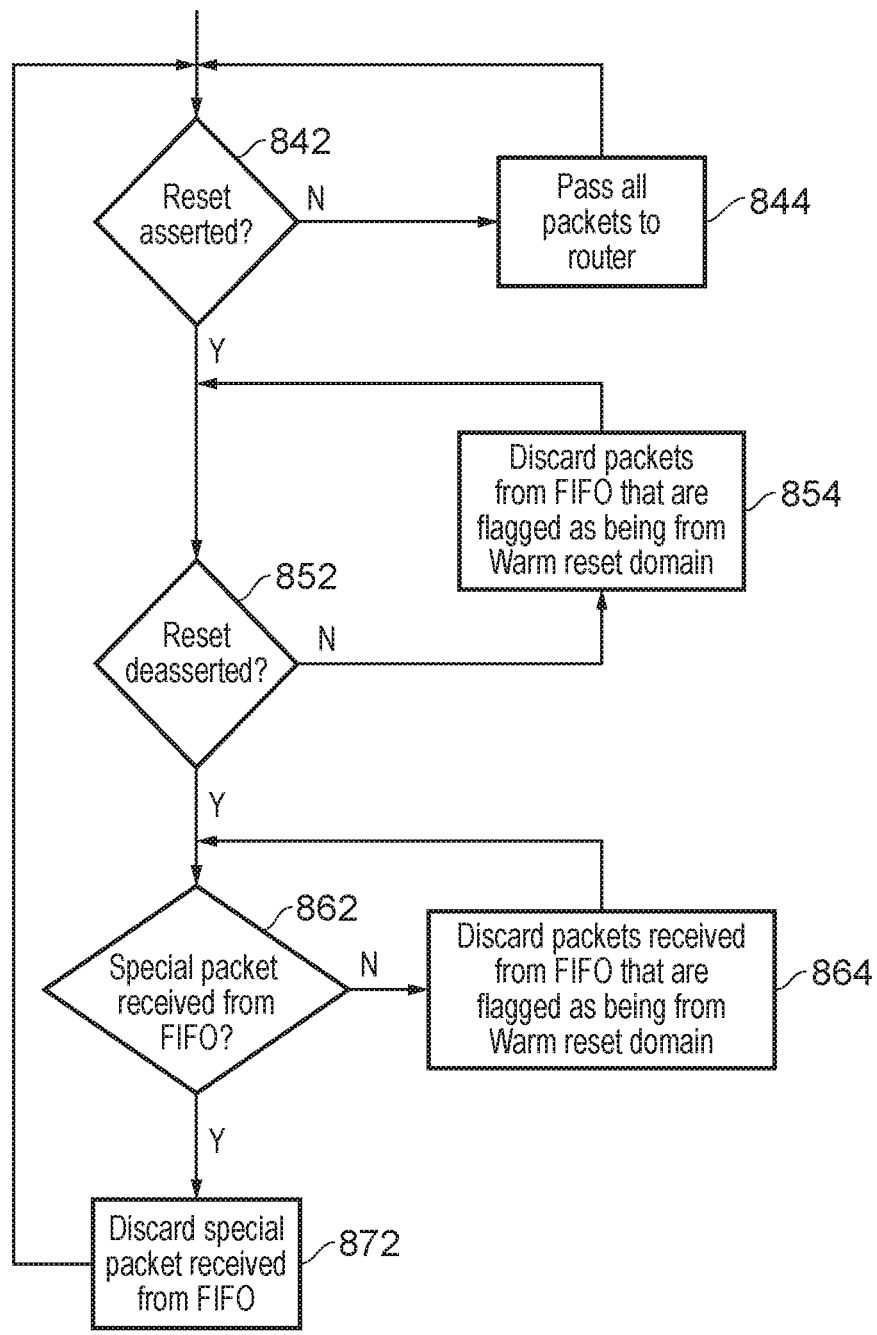
FIG. 8B is a flowchart illustrating the operation of the propagation decision circuitry of FIG. 6, in accordance with one example implementation.

Step 842 of FIG. 8B depicts the propagation decision circuitry 630 checking whether a reset is asserted in the warm reset domain 240. If a reset is not asserted, the propagation decision circuitry 630 is configured to pass packets retrieved from the buffer 620 (irrespective of whether they are associated with the warm reset domain or the cold reset domain) on to the router 650 to be sent on the appropriate destination element 370, 380, as shown in step 844.

After a reset of the warm reset domain 240 is asserted, the propagation decision circuitry 630 is configured to discard packets indicating the warm reset domain whilst the reset is asserted, as depicted by steps 852 and 854 of FIG. 8B. However packets retrieved from the buffer 620 that relate to the cold reset domain continue to be passed to the router 650.

After the reset has been deasserted, packets received from the FIFO buffer 620 that relate to the warm reset domain may still have been generated before the reset was deasserted and accordingly should be discarded. Therefore, the propagation decision circuitry 630 continues to discard any packets relating to the warm reset domain that it receives from the buffer 620 until the special packet is received, as depicted in steps 862 and 864 of FIG. 8B. When the special packet is received at the propagation decision circuitry 630 to indicate that the subsequent packets of the corresponding reset domain are to be maintained, the special packet can be discarded (as indicated by step 872) and the propagation decision circuitry 630 return to allowing the onward propagation of packets from the corresponding reset domain.

In the above examples, the system has two different reset domains, a warm reset domain and a cold reset domain. However, systems with other numbers of reset domains are also possible. A system may operate with three or more reset domains for example. In order to accommodate these domains, there may be more ingress blocks especially since some examples provide an ingress block for each source element. The representation of resets for the reset domain indicator in the transport packet and in the signal to assert/deassert resets may also need to specify the particular reset. Other circuitry may need to be reconfigured, including the egress asynchronous bridge circuitry.

Figure 9:
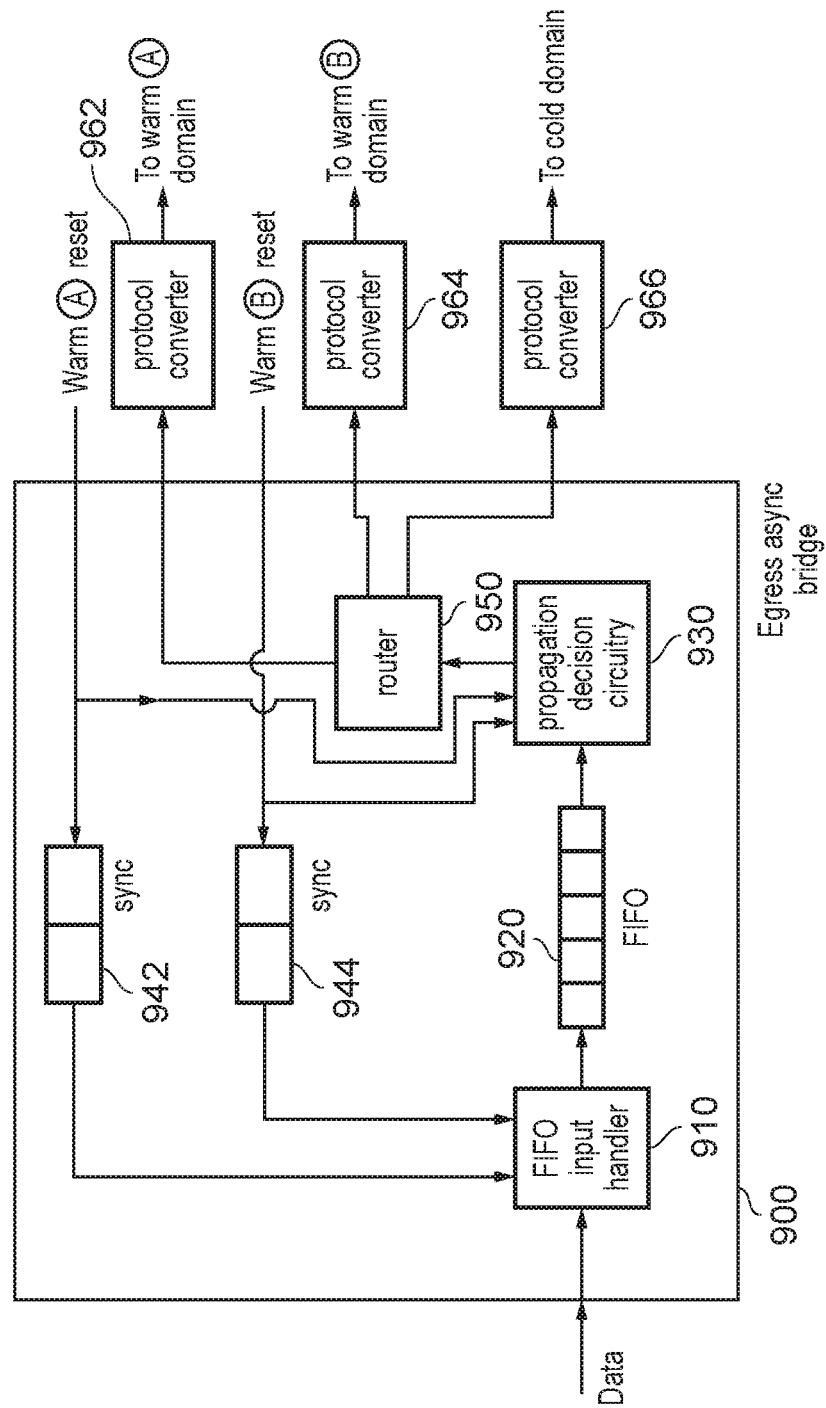
FIG. 9 illustrates an egress asynchronous bridge coupled to three reset domains, in accordance with one example implementation.

FIG. 9 illustrates an egress asynchronous bridge 900 similar to that shown in FIG. 6 but for a system with two reset domains other than the cold reset domain of the transport network 100. In such a system, a reset of warm reset domain A may be asserted so that data relating to warm reset domain A is dropped without affecting the data relating to warm reset domain B.

So as to enable this behaviour, the egress asynchronous bridge 900 receives indications of the resets asserted in both the warm reset domain A and warm reset domain B separately. Correspondingly, two synchronisation circuits 942, 944 are provided to transfer resets from each of the destination domains in to the transport clock domain.

The router 950 in this egress asynchronous bridge 900 also differs from the router 650 in FIG. 6 in that the router 950 is configured to select between the three domains to which the packet should be routed.

Further, the FIFO input handler 910 is arranged to operate in response to reset signals from both of the warm reset domains. The FIFO input handler 910 operates in a similar way to the FIFO input handler 610 of FIG. 6 but handles the two warm reset domains independently. Thus when a reset is asserted in warm reset domain A but not warm reset domain B, the FIFO input handler 910 is configured to pass incoming packets indicating warm reset domain B to the tail of the FIFO buffer 920 whilst discarding packets indicating warm reset domain A. As described above, the FIFO input handler 910 of this example also allows packets originating from the cold reset domain to pass to the FIFO buffer 920. When the reset of warm reset domain A is deasserted, a special packet is inserted at the tail of the FIFO buffer 920, with this special packet indicating that it pertains to warm reset domain A.

The propagation decision circuitry 930 is similarly adapted to operate in response to resets from both warm reset domains. So if a reset is asserted in warm reset domain A but not warm reset domain B, the propagation decision circuitry 930 is configured to pass incoming packets indicating warm reset domain B to the router 950 whilst discarding packets indicating warm reset domain A. When the reset of warm reset domain A is deasserted, the propagation decision circuitry 930 is configured to continue discarding packets from warm reset domain A until the special packet indicating warm reset domain A is received. In this way, it is possible to handle resets from several reset domains and so achieve the additional flexibility and control associated therewith, as described above.

It will be appreciated that the above-described techniques provide an efficient and effective mechanism for ensuring the propagation or discarding of data packets from different reset domains through a transport network. In particular, the correct handling of in-flight packets can be achieved, to ensure that a packet that was in-flight before a reset occurred in the associated reset domain is discarded, thus alleviating the risk of protocol violations or deadlocks. In addition, the described techniques ensure that packets generated after de-assertion of a reset in a given reset domain are not discarded at their egress destination.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:
1. An apparatus comprising:
a transport network to interconnect a plurality of elements to enable data to be transferred from a source element in said plurality of elements to a destination element in said plurality of elements, wherein at least one element in said plurality of elements operates in a reset domain other than a reset domain of the transport network;
ingress circuitry to couple source elements to the transport network, the ingress circuitry being responsive to receiving data from a source element to generate at least one transport packet in order to send that data over the transport network, each transport packet comprising a reset domain indicator indicative of the reset domain in which the source element associated with the transport packet operates; and egress circuitry to couple the transport network to destination elements and, while a reset of a particular reset domain is asserted, the reset being asserted causing data in the particular reset domain to be discarded, the egress circuitry is to discard transport packets received over the transport network for which the reset domain indicator indicates the particular reset domain.

2. An apparatus according to claim 1, wherein:
the ingress circuitry comprises an ingress block for each source element.

3. An apparatus according to claim 1, wherein:
the egress circuitry comprises at least one egress block configured to couple the transport network to a plurality of destination elements.

4. An apparatus as claimed in claim 2, wherein:
at least one source element operates in a given reset domain different from the reset domain of the transport network; and
the associated ingress block comprises suppression circuitry responsive to assertion of a reset of the given reset domain to suppress onward propagation of transport packets to the transport network.

5. An apparatus according to claim 4, wherein:
the at least one source element operates in a source clock domain different from a network clock domain employed by the transport network;
the associated ingress block comprises ingress asynchronous bridge circuitry to transition transport packets between the source and network clock domains; and
the suppression circuitry is provided in association with the ingress asynchronous bridge circuitry.

6. An apparatus according to claim 5, wherein:
the ingress asynchronous bridge circuitry further comprises buffer storage to buffer transport packets during transition of those buffer packets between the source and network clock domains.

7. An apparatus according to claim 6, wherein:
the ingress asynchronous bridge circuitry further comprises synchronisation circuitry to transfer the asserted reset of the given reset domain from the source clock domain to the network clock domain; and
the suppression circuitry comprises:
ingress suppression circuitry to suppress onward propagation of transport packets from the buffer storage in response to the asserted reset of the given reset domain in the network clock domain.

8. An apparatus according to claim 7, wherein:
the ingress asynchronous bridge circuitry is arranged, in response to deassertion of the reset of the given reset domain in the source clock domain, to insert a special packet in the buffer storage; and
after the deassertion of the reset is transferred by the synchronisation circuitry into the network clock domain, the ingress suppression circuitry is arranged to continue suppressing onward propagation until the special packet is received by the ingress suppression circuitry.

9. An apparatus according to claim 6, wherein:
the suppression circuitry comprises:
buffer suppression circuitry to suppress adding of transport packets to the buffer storage in response to the assertion of the reset of the given reset domain in the source clock domain.

10. An apparatus according to claim 3, wherein:
at least one destination element operates in a destination clock domain different from a network clock domain employed by the transport network and operates in the particular reset domain, the particular reset domain being different from the reset domain of the transport network;
an associated egress block comprises egress asynchronous bridge circuitry to transition transport packets between the network and destination clock domains; and
the egress asynchronous bridge circuitry comprises suppression circuitry arranged to perform the discarding of transport packets.

11. An apparatus according to claim 10, wherein:
the egress asynchronous bridge circuitry further comprises egress buffer storage to buffer transport packets during transition of those buffer packets between the network and destination clock domains.

12. An apparatus according to claim 11, wherein:
the suppression circuitry comprises egress suppression circuitry arranged, in response to an asserted reset of the particular reset domain in the destination clock domain, to suppress onward propagation from the egress buffer circuitry of any transport packets whose reset domain indicator identifies the particular reset domain.

13. An apparatus according to claim 12, wherein:
after deassertion of the reset of the particular reset domain in the destination clock domain, the egress suppression circuitry is arranged to continue suppressing onward propagation until a special packet is received by the egress suppression circuitry.

14. An apparatus as claimed in claim 13, wherein:
the egress asynchronous bridge circuitry further comprises synchronisation circuitry to transfer a reset state of the particular reset domain from the destination clock domain to the network clock domain; and
after deassertion of the reset of the particular reset domain is transferred by the synchronisation circuitry into the network clock domain, the egress asynchronous bridge circuitry is arranged to insert the special packet in the egress buffer storage.

15. An apparatus as claimed in claim 13, wherein:
the ingress circuitry is arranged to generate the special packet on deassertion of the reset of the particular reset domain, for propagation over the transport network to the egress circuitry.

16. An apparatus according to claim 11, wherein:
the suppression circuitry further comprises:
egress buffer suppression circuitry to suppress adding of transport packets to the egress buffer storage in response to the assertion of the reset of the particular reset domain in the network clock domain.

17. An apparatus according to claim 1, wherein:
the ingress circuitry comprises protocol conversion circuitry to generate the at least one transport packet, by performing protocol conversion to convert the received data from a first protocol associated with the received data to a second protocol associated with the transport network, and inserting the reset domain indicator.

18. An apparatus according to claim 1, wherein:
at least one element is both a source element for a first data transfer and a destination element for a second data transfer.

19. An apparatus as claimed in claim 1, wherein:
at least two elements operating in different reset domains are incorporated within a single device.

20. An apparatus according to claim 1, wherein:
at least two elements in said plurality of elements operate in reset domains other than a reset domain of the transport network and different from each other; and
the ingress circuitry and the egress circuitry operate so as to handle resets for each reset domain other than the reset domain of the transport network.

21. A method of handling resets, comprising:
on a transport network to interconnect a plurality of elements, transferring data from a source element in said plurality of elements to a destination element in said plurality of elements, wherein at least one element in said plurality of elements operates in a reset domain other than a reset domain of the transport network
at ingress circuitry to couple source elements to the transport network, responsive to receiving data from a source element, generating at least one transport packet in order to send that data over the transport network, each transport packet comprising a reset domain indicator indicative of the reset domain in which the source element associated with the transport packet operates; and
at egress circuitry to couple the transport network to destination elements, while a reset of a particular reset domain is asserted, the reset being asserted causing data in the particular reset domain to be discarded, discarding transport packets received over the transport network for which the reset domain indicator indicates the particular reset domain.

* * * * *